Oct. 22, 1929.    B. F. NEAL    1,732,374
SCOTER
Filed Dec. 16, 1927
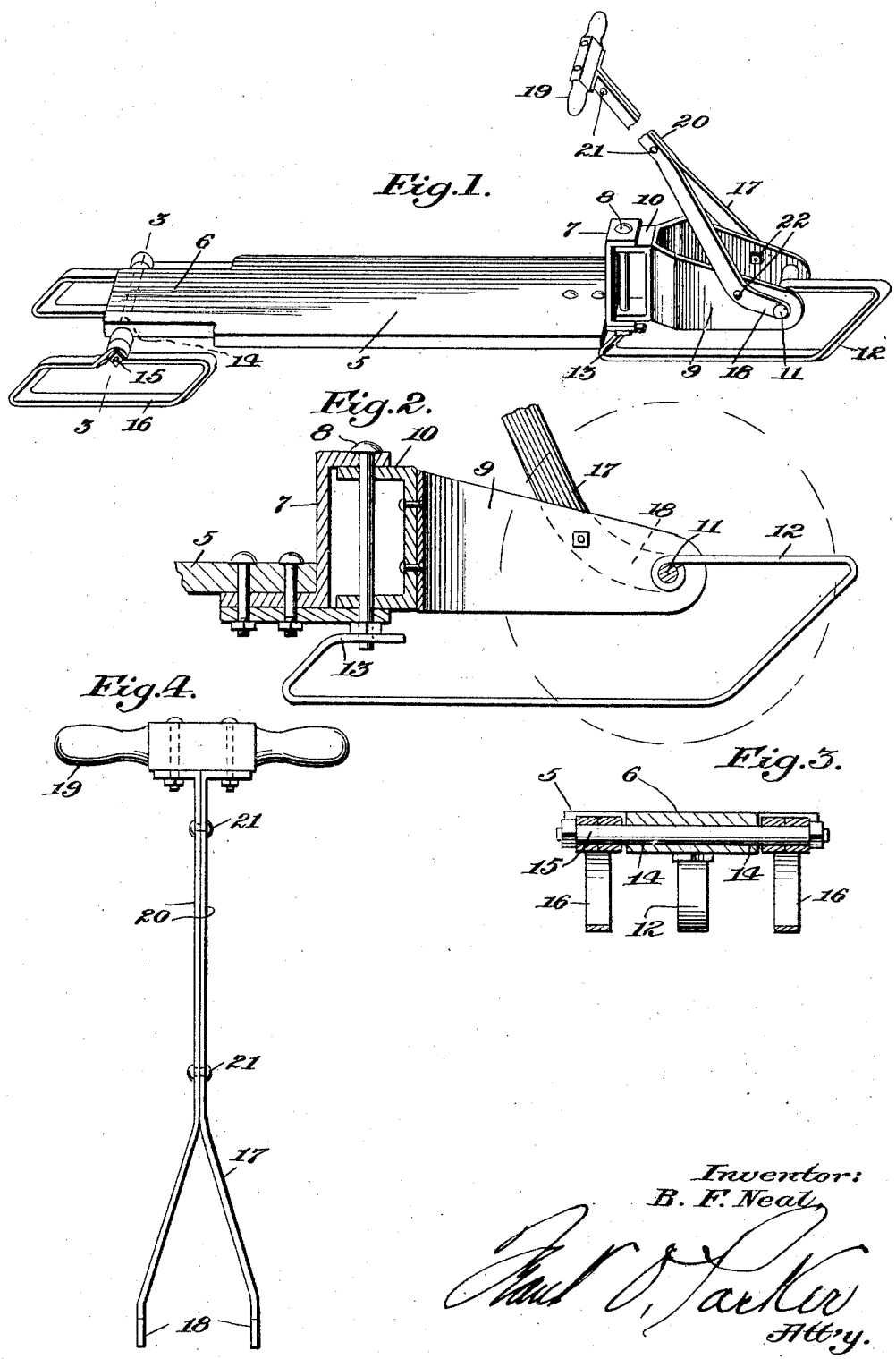
Inventor:
B. F. Neal Patented Oct. 22, 1929

1,732,374

UNITED STATES PATENT OFFICE

BENJAMIN F. NEAL, OF COUNCIL BLUFFS, IOWA

SCOOTER

Application filed December 16, 1927. Serial No. 240,495.

The invention relates to vehicles, and more especially to the class of vehicles to be used by children, and which may be propelled by the feet of the rider, commonly known as scooters.

In vehicles of the kind above referred to it has been found somewhat difficult to steer the same when being propelled by a rider, especially where the scooter is of the convertible type, for use either as a wheeled or sled runner type. Therefore, it is the aim of the present invention to provide a vehicle of the type mentioned, wherein the construction thereof permits it to be converted into a wheeled or sled runner type of scooter, and both being readily and easily steered without undue strain or exertion on the part of the user or operator, the scooter being adaptable for road travel or over ice, snow or frozen surfaces.

By the construction of the scooter, it may be propelled by striking on the ground or surface with one foot, while the other foot of the rider is resting upon the vehicle, the steering means being forwardly of the rider and serves as a support or handle bar, which may be easily raised or lowered to the degree suitable to the user of the vehicle.

A further aim of the invention is to provide a vehicle of this character, wherein the construction thereof is novel in form, so as to be thoroughly reliable and efficient in its purposes, strong, durable, and inexpensive to manufacture.

With the above and other objects in view the invention consists in the features of construction, combination and arrangement of parts as will be hereinafter more fully described, illustrated in the accompanying drawing, showing the preferred embodiment of the invention, and pointed out in the claim hereunto appended. It is to be understood of course, that changes, variations and modifications may be made in the invention, as come properly within the scope of the appended claim, without departing from the spirit of the invention, or sacrificing any of its advantages.

In the accompanying drawing:

Figure 1, is a perspective view of the scooter constructed in accordance with the invention.

Figure 2, is a fragmentary longitudinal sectional elevation through the same.

Figure 3, is a sectional view on the line 3—3 of Figure 1.

Figure 4, is a detail elevation of the handle bar detached.

Similar reference characters indicate corresponding parts throughout the several views in the drawing.

In the drawing, 5, designates generally a base or bed which may be constructed of wood or metal having a reduced rear end 6, while secured in any desirable manner to the forward end of said base or bed centrally thereof is a king bolt bracket 7, the latter rising above the upper side of the base or bed and has removably fitted therein a kingbolt 8, forming a vertical pivot for a front fork 9, preferably made from sheet metal cut and bent as is clearly shown in Figures 1 and 2, of the drawing. This fork 9, carries at its rear end a king bolt cleat 10, so that by the bolt 8, the proper coupling can be made with the bracket 7, as shown.

Mounted in the forward open end of the fork 9, is a removable journal or axle 11, with which is engaged the nose end portion of a front runner 12, the latter having its heel 13, detachably connected with the king bolt 8, beneath the base or bed 5, of the scooter.

Mounted in suitable bore 14, formed transversely through the reduced end 6, of the base or bed 5, is a rear journal or axle 15, on the ends of which are mounted the rear runners 16, these being removable and are located at opposite sides of said base or bed.

Engaged with the journal or axle 11, exteriorly of the fork 9, is a swinging handle bar or steering member 17, the ends 18, engaged with the journal or axle 11, being readily removable for permitting the converting of the vehicle to a wheeled one.

This handle bar or member 17, is provided with a cross arm 19, forming handles. The handle bar or member 17, is preferably made from a pair of companion metal strips 20, riveted as at 21, to each other, although such bar or member may be otherwise made if found desirable.

If required the handle bar or member 17, may be held against swinging movement by means of removable fasteners 22, these being engaged in the front fork 9, and the strips 20, of said bar or member.

From the foregoing it is thought that the construction and manner of use of the vehicle will be clearly understood, therefore, a more extended explanation has been omitted.

What is claimed is:

In a vehicle of the kind described, a substantially horizontally disposed bed, a substantially Z-shaped bracket secured at its lower end to the forward end of the bed, a removable plate carried by the lower end of said bracket, a front wheel fork having pivot ears at its rear closed end, a pivot bolt engaging the upper end of the bracket, the plate and pivot ears of the fork for swingingly connecting the latter for horizontal movement to the forward end of the bed, axles carried by the rear end of the bed and forward end of the fork for supporting ground traveling elements, and a forwardly and rearwardly swinging handle pivoted to the front of the fork and detachably made fast thereto rearwardly of its pivotal connection.

In testimony whereof I affix my signature.

BENJAMIN F. NEAL.